US008699501B2

(12) United States Patent
Shin et al.

(10) Patent No.: US 8,699,501 B2
(45) Date of Patent: Apr. 15, 2014

(54) RESIDENTIAL GATEWAY SYSTEM FOR HOME NETWORK SERVICE

(75) Inventors: Young-sik Shin, Seoul (KR); Yong-gil Park, Sungnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 849 days.

(21) Appl. No.: 11/994,378

(22) PCT Filed: Jul. 4, 2005

(86) PCT No.: PCT/KR2005/002106
§ 371 (c)(1),
(2), (4) Date: Apr. 10, 2008

(87) PCT Pub. No.: WO2007/004754
PCT Pub. Date: Jan. 11, 2007

(65) Prior Publication Data
US 2008/0205419 A1 Aug. 28, 2008

(51) Int. Cl.
*H04L 12/28* (2006.01)
*H04L 29/08* (2006.01)
*H04L 12/66* (2006.01)

(52) U.S. Cl.
USPC .......... 370/401

(58) Field of Classification Search
CPC .......... H04L 67/16; H04L 29/08081; H04L 29/0809; H04L 29/08099; H04L 12/2827; H04L 12/2834; H04L 12/2836; H04L 12/2805; H04L 12/2807; H04L 12/2809; H04L 12/2814; H04L 12/2816; H04L 12/2818; H04L 12/2823; H04L 12/2825; H04L 12/283
USPC .......... 370/401
See application file for complete search history.

(56) References Cited

U.S. PATENT DOCUMENTS

| | | | | |
|---|---|---|---|---|
| 2003/0018753 | A1* | 1/2003 | Seki | 709/219 |
| 2003/0187920 | A1* | 10/2003 | Redkar | 709/203 |
| 2003/0217136 | A1 | 11/2003 | Cho et al. | |
| 2005/0015462 | A1 | 1/2005 | Lee et al. | G06F 17/30 |

(Continued)

FOREIGN PATENT DOCUMENTS

| | | | |
|---|---|---|---|
| EP | 1133204 | A1 | 9/2001 |
| JP | 2005-174319 | | 11/2004 |

(Continued)

OTHER PUBLICATIONS

International Search Report mailed on Mar. 30, 2006 for PCT/KR2005/002106.

(Continued)

*Primary Examiner* — Ayaz Sheikh
*Assistant Examiner* — Tarell Hampton
(74) *Attorney, Agent, or Firm* — Lowe Hauptman & Ham, LLP

(57) ABSTRACT

Disclosed herein is a Residential Gateway (RG) system for home network service. The RG system receives various supplementary services through a Home Network Serving Node (HNSN) that provides home network service. The system includes an Open Service Gateway initiative (OSGi) framework, an RG agent, a virtual Universal Plug and Play (UPnP) device, and a Java virtual machine. The RG agent is installed on the OSGi framework and implemented in bundle form. The UPnP device is registered on the OSGi framework by the RG agent. The Java virtual machine is ported by the RG agent to hardware on which an operating system is installed.

20 Claims, 7 Drawing Sheets

(56) References Cited

U.S. PATENT DOCUMENTS

| | | | | |
|---|---|---|---|---|
| 2005/0044301 | A1* | 2/2005 | Vasilevsky et al. | 711/1 |
| 2005/0099982 | A1* | 5/2005 | Sohn et al. | 370/338 |
| 2005/0132191 | A1* | 6/2005 | Joshi et al. | 713/168 |
| 2005/0144262 | A1 | 6/2005 | Kang et al. | G06F 15/177 |
| 2006/0067341 | A1* | 3/2006 | Barber et al. | 370/401 |
| 2006/0133391 | A1* | 6/2006 | Kang et al. | 370/401 |
| 2006/0153072 | A1* | 7/2006 | Bushmitch et al. | 370/230 |
| 2006/0155850 | A1* | 7/2006 | Ma et al. | 709/226 |
| 2006/0209868 | A1* | 9/2006 | Callaghan | 370/428 |

FOREIGN PATENT DOCUMENTS

| | | | |
|---|---|---|---|
| WO | WO00/74409 | A1 | 12/2000 |
| WO | 02/05118 | | 1/2002 |
| WO | WO02/101993 | A1 | 12/2002 |
| WO | WO03/098873 | A1 | 11/2003 |

OTHER PUBLICATIONS

European Search Report for application No. 05765964.

OSGI Service Platform; "Open Services Gateway Initiative"; Release 3; Mar. 2003; 210 pages.

Kang et al.; "UPnP AV Architectural Multimedia System with an OSGI Platform"; IEEE; 2004; pp. 442-446.

Microsoft Corporation; "Universal Plug and Play Device Architecture"; Version 1.0; Jun. 2000; XP-002210614; pp. 1-86.

Japanese office action for 2008-519151.

Wang et al.; "Graphical User Interfaces in the Distributed Hydrological Model"; Journal of Arid Land Resources and Enviroment; Mar. 2005; vol. 19; No. 2; pp. 40-45; (see last page for English abstract).

Chinese office action for application No. 200580050988.1 dated May 3, 2011.

* cited by examiner

RESIDENTIAL GATEWAY SYSTEM FOR HOME NETWORK SERVICE

CROSS REFERENCE TO RELATED APPLICATION

This application is the National Phase application of International Application No. PCT/KR2005/00002106, filed Jul. 4, 2005, which designates the United States and was published in English. This application, in its entirety, is incorporated herein by reference.

TECHNICAL FIELD

The present invention relates, in general, to a residential gateway system for home network service and, more particularly, to a residential gateway system for providing home network service on the basis of Open Service Gateway initiative and Universal Plug and Play.

BACKGROUND ART

Currently, various types of home networking middleware, intelligent information appliances, and residential gateways based on various wired-wireless network technologies in a home networking market, and various development environments exist due to different hardware platforms, Operating Systems (OSs) and network protocols.

Home networking middleware, such as Java Intelligent Network Infra-structure (JINI), Home Wide Web (HWW), Home Audio Video interoperability (HAVi), or Universal Plug and Play (UPnP), has purposes of communication and control between intelligent information appliances, and a Residential Gateway (RG) operates as a gateway that dynamically transfers services, which are separately provided by various service providers, to a home network.

In these environments, efforts are being made to make use of a dynamic service management function in conjunction with a control function for intelligent information appliances through home networking middleware, and a representative example, as shown in FIG. 1, is the interoperable model of Open Service Gateway initiative (OSGi)-based home networking middleware. That is, it is desired to provide a integration type model for the two functions by developing a service bundle for home networking and installing it on an OSGi framework.

OSGi aims to integrate various network standards and technologies for internal networks and external networks, like a single system, by defining a standard for dynamic service management through Application Program Interfaces (APIs) having consistent form, and providing a framework that is a java-based platform-independent service environment.

When the various network standards and technologies of OSGi-based internal and external networks are combined like a single system, a demand for a RG standard may increase. However, sufficient standardization work for the RG has not been performed.

Meanwhile, control devices, which are capable of integrally managing devices (home appliances) that use various communication protocols and are dispersed in home, are also being developed. That is, home network control devices, which are capable of supporting all communication protocols, such as International Electrical and Electronics Engineering (IEEE) 1394, Universal Serial Bus (USB), Infrared Data Association (IrDA), X-10, and Lonworks, are being developed.

DISCLOSURE OF INVENTION

Technical Problem

However, the standardization of the interoperable protocol for a Home Network Serving Node (hereinafter referred to as an 'HNSN'), which functions as a central server provided for home networking and home automation, and RGs installed in homes, have not been conducted.

Technical Solution

Accordingly, the present invention has been made keeping in mind the above problems occurring in the prior art, and an object of the present invention is to provide a RG system, which is capable of integrally managing, controlling, and monitoring all devices connected to an OSGi and UPnP-based home network.

Advantageous Effects

The present invention has the following effects:

First, all devices, which are connected to a home network through an OSGi-based residential gateway, can be integrally managed, and detailed information about these devices can be acquired.

Second, a standard for an OSGi-based RG is presented, so that various high-quality home network services can be provided and, at the same time, the extension of devices and services can be facilitated.

Third, a UPnP-based RG system can be established, so that devices in the home network can be controlled from outside the home network and remotely monitored and controlled using only a browser.

BEST MODE FOR CARRYING OUT THE INVENTION

The present invention provides a Residential Gateway (RG) system for home network service, the system receiving various supplementary services through a Home Network Serving Node (HNSN) that provides home network service, the system including an OSGi framework; an RG agent installed on the OSGi framework, and implemented in bundle form; a virtual UPnP device registered on the OSGi framework by the RG agent; and a java virtual machine ported by the RG agent on hardware on which an operating system is installed.

In addition, the present invention provides an RG system for home network service, including an OSGi framework; an RG agent installed on the OSGi framework, and implemented in bundle form; and UPnP device service registered on the OSGi framework by the RG agent.

In addition, the present invention provides a UPnP-based RG system for home network service, the RG system including an HNSN connected to a mobile network to control devices and transfer control statuses of the devices, and a home gateway connected to the HNSN through a network and connected to the devices, wherein the home gateway comprises a Web server and a UPnP proxy that detect devices connected and disconnected to and from the home gateway, and create a device list Web document, receive a remote control signal, which is generated by a user, from the HNSN and perform control, transmit a response message regarding the control, and monitor event generation by the devices.

Mode for the Invention

The construction and operation of an embodiment of the present invention are described in detail with reference to the accompanying drawings below.

Figure 1:
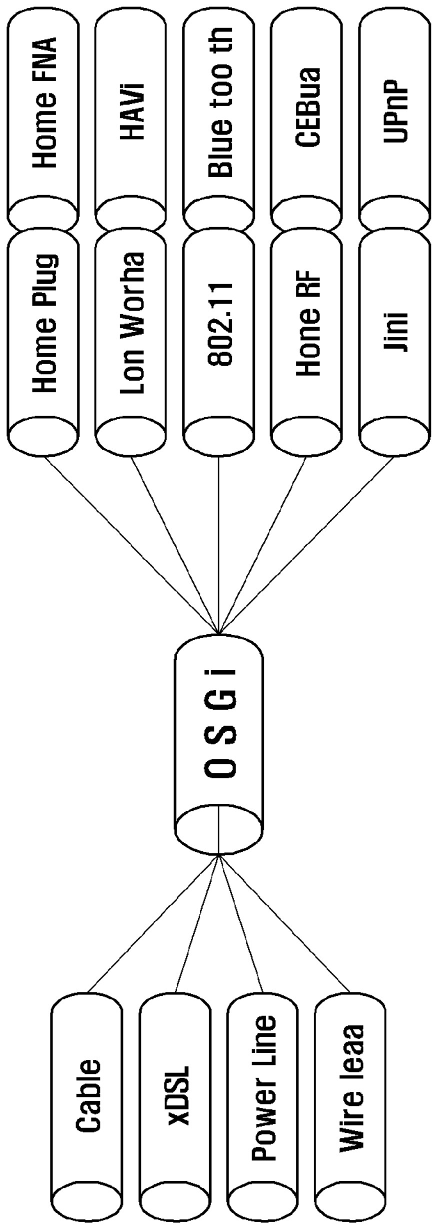
FIG. 1 is an interoperable model of conventional OSGi-based home networking middleware.
Figure 2:
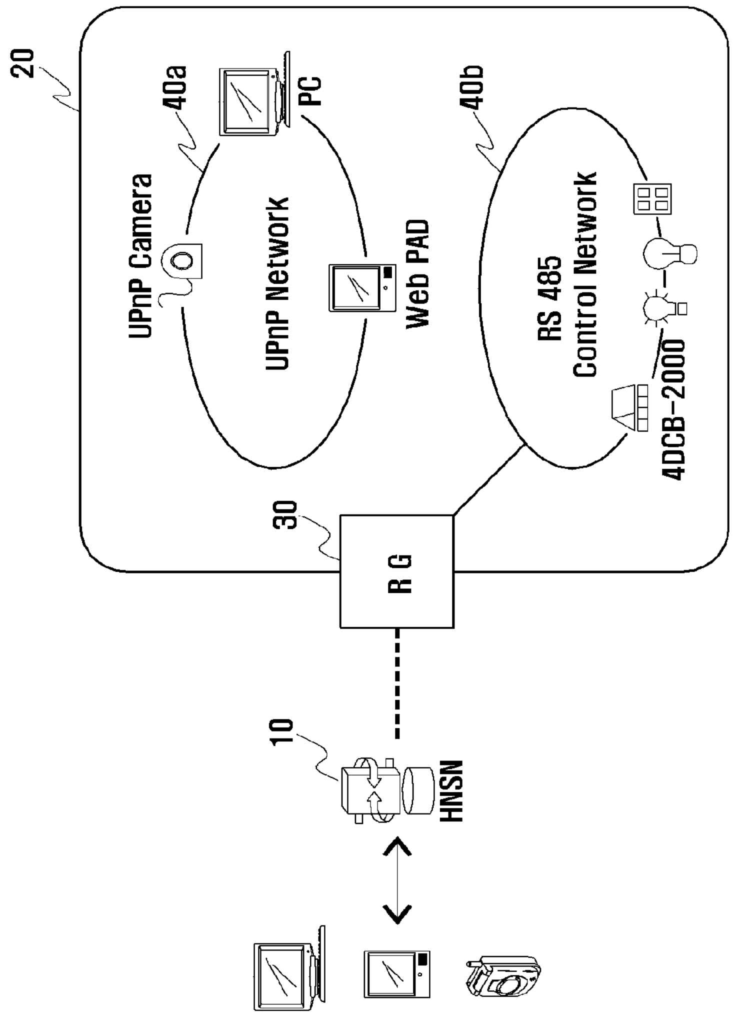
FIG. 2 is a diagram showing the construction of a network system to which the RG of the present invention is applied.

FIG. 2 is a diagram showing the construction of a network system to which the RG of the present invention is applied. As shown in FIG. 2, the network system, to which the RG is applied, includes an HNSN 10 that provides home network service, and an RG 30 and local networks 40*a* and 40*b* that constitute a home network 20.

The HNSN 10 operates in conjunction with Personal Computers (PCs), or SK-Virtual Machine (VM) or Wireless Application Protocol (WAP) mobile phone terminals connected to a network from which home network service can be received, and functions as a central server for providing the home network service.

The RG 30 is connected to the HNSN 10 through the network or the Internet to receive various supplementary services. In particular, the RG 30 performs functions, such as the control and monitoring of home devices, the updating and rebooting of RG SoftWare (S/W), and the control of gateway home network device using the Web service of a registration gateway, and the setting of a network.

The local network 20 may be constructed from, for example, a UPnP network 40*a* and a Recommended Standard (RS)-485 control network 40*b* that is a kind of Power Line Communication (PLC), and is connected to different types of home network devices (UPnP cameras, PCs, Web PADs, illumination devices, crime prevention devices, and the like) to share information or control various functions.

The HNSN 10 and the RG 30, as described later, perform communication using HNSN-RG protocols.

Figure 3:
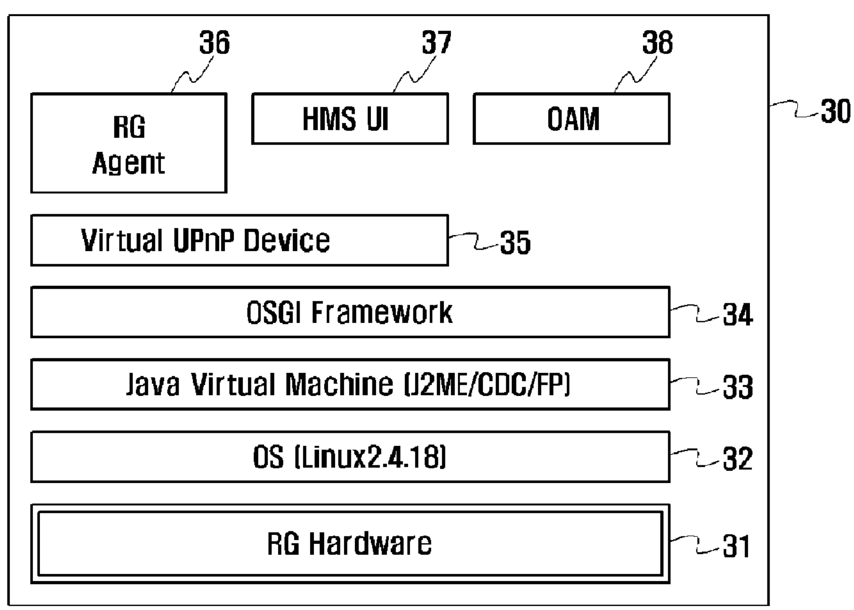
FIG. 3 is a diagram showing the software architecture of the OSGi-based RG of the present invention.

FIG. 3 is a diagram showing the software architecture of the OSGi-based RG of the present invention. As shown in FIG. 3, the internal software of the RG 30 includes an OS 32 on RG hardware 31, a java virtual machine 33, an OSGi framework 34, a virtual UPnP device 35, an RG agent 36, a graphic interface for supporting a Hydrologic Modeling System (HMS) a User Interface (UI) 37, and an Operation, Administration and Maintenance (OAM) 38 for undertaking network setting, the main functions of which are described below.

Linux version 2.4.18 is used for the OS 32, cvm 1.0.1, which satisfies J2ME/CDC, that is, the java virtual machine of Sun Co., is used for the java virtual machine 33, and the 4DAgent™ of 4DHomeNet is used for the OSGi framework 34.

Instead of a UPnP bundle, the virtual UPnP device 35 performs a UPnP protocol on the local network, like an actual UPnP device.

The RG agent 36, which is an agent that operates in conjunction with the HNSN 10, is a bundle that uses the OSGi framework 34.

The HMS UI 37 is a bundle that supports a graphic interface, and the OAM 38 is a kind of network management bundle that undertakes the operation, management and maintenance of a network.

Figure 4:
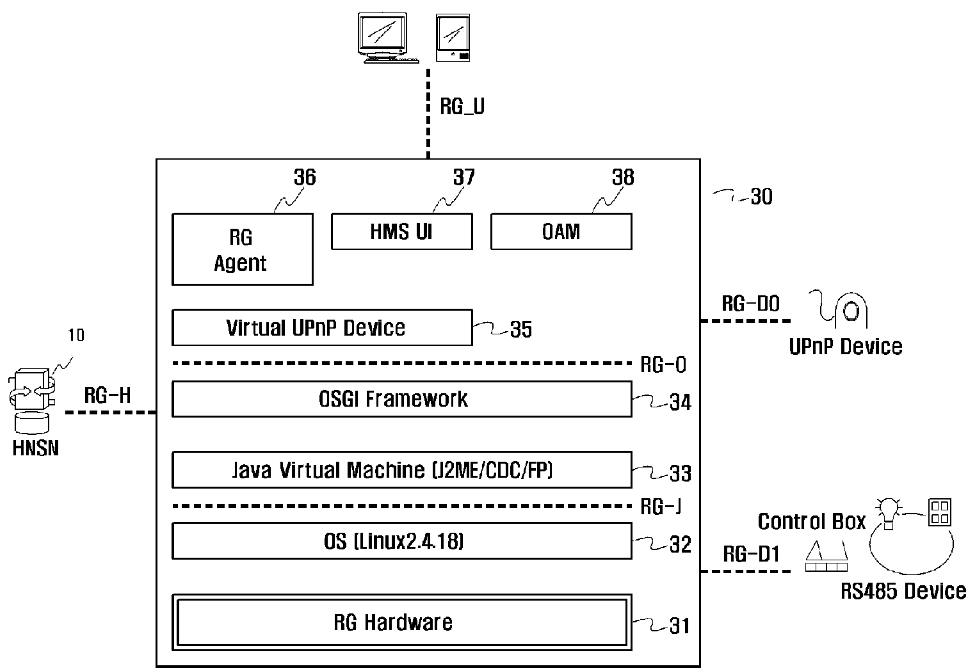
FIG. 4 is a diagram showing the interface structure of the OSGi-based RG of the present invention.

FIG. 4 is a diagram showing the interface structure of the OSGi-based RG of the present invention. As shown in FIG. 4, interfaces between the RG, devices connected to the RG, and users may be defined below.

The devices, such as PCs or Web PADs, and UPnP devices, which are connected to the RG 30, operate in conjunction with HNSN 10 though an RG-H interface, and the RG 30 provides functions, such as the registration and authentification of the RG 30, periodic RG keep-alive message transfer, the controlling and monitoring of devices connected to the RG 30, the rebooting of the RG 30, and the updating of bundles.

Furthermore, the RG 30 is connected with the home devices through RG-D0 and RG-D1 interfaces.

The RG-D0 interface, which is an interface for network devices connected to the home IP network of the RG 30, supports standard UPnP.

The RG-D1 interface is collectively connected to RS-485 devices by a Control-box (C-box) connected with the RS-485 devices, and is connected to the RG 30 through an RS-232 interface. The interface between the C-box and the RG is the RG-D1.

An RG-U interface, which is UI that allows a user to directly control the home devices of Web PADs in home and the like, is an interface that provides general Web service.

An RG-O interface and an RG-J interface are the internal interfaces of the RG. The RG-J interface is an API that enables the java virtual machine 33 to be ported to the hardware 31 on which the OS 32 is installed, and the RG-O interface, which is an API between the OSGi framework 34 and the bundles 36, 37 and 38, provides an API that satisfies the standard of OSGi R3 and also provides an API for a service provider or preparing a virtual device.

The interfaces are classified in the following Table 1.

TABLE 1

| I/F name | Description | Related standard |
|---|---|---|
| GR-H | RG-HNSN Interface | RG-HNSN Protocol (SKT Standard) |
| GR-U | RG-User Interface | RG User Web Interface (HTTP) |
| GR-DO | RG-UPnP Device Interface | UPnP |
| GR-D1 | RG-Cbox (RS458 Device) Interface | Interior Standard of 4DHomeNet |
| GR-O | OSGi Framework API | OSGi API Specification |
| GR-J | J2ME/CDC Porting Interface | J2ME/CDC Host Programming Interface |

Meanwhile, the RG-HNSN interface is a protocol between the RG 30 and the HNSN 10.

The RG-HNSN interface is a protocol in which an RG registration and authentification function and a keep-alive function for RG management, are added to a UPnP protocol having discovery, description, control, and event functions for devices in an IP-based home network, and are then applied to a Wide Area Network (WAN).

The RG-HNSN interface has the following functions:

1) RG registration/authentification and keep-alive functions

2) Device discovery function

3) Device Description function

4) Device query and control function

5) Device event function

6) RG device remote rebooting function

7) RG S/W remote update function

8) Remote control function for the network port forwarding of the RG

The RG-HNSN protocol having the functions is summarized in the following Table 2.

TABLE 2

| Function Classification | Message | Protocol | Direction | Transmitting details |
|---|---|---|---|---|
| | Registration | SOAP | HNSH ← RG | RG IP, SSDP/SOAP/GENA URL |
| | Alive | SOAP | HNSH ← RG | RG Aliveness |
| | Bye | SOAP | HNSH ← RG | Bye |
| Discovery | Search | SOAP | HSNS → RG | Description URL |
| | Advertise | SSDP | HNSN ← RG | Description URL |
| Description | Device | HTTP | HNSN → RG | Device Description |
| | Service | HTTP | HNSN → RG | Service Description |
| Query & Control | Query | SOAP | HNSN → RG | Query Status |
| | Control | SOAP | HNSN → RG | Control Status |
| Event | Subscribe | GENA | HNSN → RG | Event subscription |
| | Notify | GENA | HNSN ← RG | Event |

Detailed descriptions of Table 2 follow an RG-HNSN interface standard.

An RG-side agent responsible for communication between the HNSN 10 and the RG 30 is the RG agent 36. The RG agent 36 operates on an OSGi framework because it is implemented as an OSGi bundle. Furthermore, since the HNSN 10 and the RG agent 36 perform communication through protocols, such as a Simple Service Discovery Protocol (SSDP), a Hypertext Transfer Protocol (HTTP), a Simple Object Access Protocol (SOAP), and a General Event Notification Architecture (GENA), the RG agent 36 implements the respective protocols.

The RG agent 36 performs an RG agent function and a device proxy function.

RG Agent Function

The RG agent 36 acts as a connection link between the RG 30 and the HNSN 10, registers the RG 30 or periodically transmits an RG heart beat, and informs the termination of the RG connection at the time of completion. Furthermore, the RG agent 36 manages a list of devices that are currently connected to the RG 30, and allows the list to be transferred when the HNSN request it. Furthermore, the RG agent 36 transmits update information to the HNSN when the list of devices is updated.

1) Registration function (a function of registering the RG on the HNSN):

The RG agent 36 sends a registration message to the HNSN when the RG agent 36 registers the RG on the HNSN. In this case, the RG agent 36 sends connection information and an RG ID/password. The HNSN performs authentification using the RG ID/password, and stores the connection information of the RG and sends an OK response when the authentification has been successfully performed.

2) Heart-beat function (function of periodically informing the HNSN of the current status of the RG):

When the RG agent 36 is successfully registered, the RG agent 36 transfers the heart beat of the RG 30 to the HNSN 10 by periodically (typically, at one minute interval) sending the current IP information of the RG 30 along with alive messages to the HNSN 10, so that the RG agent 36 allows the IP information of the RG 30 to be managed.

3) Graceful bye function (function of, when the RG terminates, informing the HNSN of the termination of the RG and of performing termination):

When the RG agent 36 terminates normally or is rebooted, the RG agent 36 sends a bye message to the HNSN 10, thus allowing the HNSN 10 to manage the status information of the RG 30.

4) Connected device list maintenance function (a function of managing a list of devices currently connected to the RG and transmitting the list to the HNSN):

When a request from the HNSN 10 exists, the RG agent 36 transmits a list of the home devices connected to the RG 30.

5) New device notification function (a function of detecting newly connected devices, updating the list of the devices, and notifying the HNSN of the detection of new devices):

When the RG 30 detects that new home devices are connected to it, the RG agent 36 sends information about newly attached devices to the HNSN 10 and updates the list of the devices.

Device Proxy Function

The RG agent 36 periodically reports the current status of the RG 30 to the HNSN 10, and acts as a proxy for devices that are installed in the home and connected to the RG 30.

1) Device control function (performing the device control request of the HNSN):

When the RG agent 36 receives device control commands from the HNSN 10, the RG agent 36 discovers and control corresponding devices. Thereafter, the RG agent 36 transmits the results of the control to the HNSN 10.

2) Device status query function (performing the device current-status query request of the HNSN):

Querying to check the status of devices is processed in the same manner as in the device control function. When the HNSN 10 transmits query instructions to the RG agent 36, the RG agent 36 checks the status of corresponding devices and transmits status values to the HNSN 10.

3) Device event subscription/unsubscription function (the HNSN applying and canceling the event subscription of devices):

The HNSN 10 may subscribe to the events of a specific device. For the subscription to events, the subscription to events is requested to the RG agent 36. The subscription to events may be cancelled when the subscription of events is not necessary any more.

4) Device event notification function (transmitting events, which are generated by devices, to the HNSN that has requested the event subscription of the devices):

When an event is generated due to variation in the status of a certain device, the RG agent 36 transmits an event message to the HNSN 10 that has requested the event subscription.

With reference to FIG. 4, the structure of the RG agent is described below.

Communication with the HNSN 10 is performed using a UPnP-based HNSN-RG protocol.

The UPnP collects the information about devices and controls the devices using protocols, such as HTTP, SSDP, GENA, and SOAP, which are currently used based on Transmission Control Protocol (TCP)/IP technology.

SSDP Protocol

The HNSN 10 and the RG agent 36 transmit requests, such as M-SEARCH and NOTIFY, to each other using SSDP/UDP.

1) M-SEARCH

This is a request that is mainly transmitted to the RG agent 36 by the HNSN 10, and is used when the HNSN 10 intends to acquire the list of home devices connected to the RG 30. Commonly, M-SEARCH is requested when the RG agent 36 performs registration, or a user makes a "new change" to the list of home devices of the RG 30 through the HNSN UI. When the RG 30 receives the request, the RG 30 checks currently connected home devices and, responses to the request of the HNSN 10 with the Web Uniform Resource Locators (URLs) of description files that describe respective devices, inserted into the location header of a HTTP 200 OK of the HNSN 10, for the respective devices.

2) NOTIFY

When the RG agent 36 requests registration from HNSN 10 and the HNSN 10 responds to the request, the RG agent 36 transmits a list of devices, detected by the RG agent 36, to the HNSN 10 using SSDP/NOTIFY. Even in this case, the RG agent 36 transmits the URLs of the description files of the respective devices, which are inserted into the location header, similarly to the response of the M-SEARCH.

HTTP Protocol

This is used when the HNSN 10 downloads an XML file from the description URL transmitted by the RG agent 36 using SSDP.

SOAP Protocol

This is used in two cases, namely, the case in which the RG agent 36 is a control point device, and the case in which the RG agent 36 is a proxy device.

1) The case where the RG agent is a control point

Requests, such as Registration/Alive/Bye/ SetPreference/ GetPreference, are transferred to the HNSN 10.

(1) Registration SOAP Request

Assuming that the RG 30 knows basically connection information about the HNSN 10, the RG 30 first requests registration from the SOAP port of the HNSN 10 after the RG 30 is booted and an engine is executed. The HNSN 10 performs authentification, and completes the registration by sending an OK response if the authentification is successful. The HNSN 10 sends a 500 error response if authentification fails or errors exist. The RG 30 waits for a predetermined time and then attempts registration again when the RG 30 receives the 500 error response.

(2) Alive SOAP Request

The RG 30 periodically requests Alive to the HNSN 10 thereafter when the registration is successful. The periodic Alive request is to notify the HNSN 10 of any abnormality of the RG 30 in the case in which the RG 30 is abnormally operated or abruptly powered down. Furthermore, when the RG 30 has a flexible IP and the IP of the RG 30 changes, the periodic Alive request allows the HNSN 10 to manage a changed IP.

(3) Bye SOAP Request

The RG 30 requests Bye to the HNSN 10 upon being normally powered down by a user or a manager. The HNSN 10 changes the status information of the RG to Power-down upon receiving the Bye, and sends an OK response. The RG 30 terminates completely upon receiving the OK response.

(4) SetPreference SOAP Request

This sets authorities that are capable of accessing to the RG 30, and controlling and monitoring devices connected to the RG 30.

(5) GetPreference SOAP Request

This acquires authorities that are capable of accessing to the RG 30 set on the HNSN 10 RG 30, and controlling and monitoring devices connected to the RG 30.

2) The case where the RG agent is a proxy device

When it is desired to perform control/query on one device that belongs to a list of devices connected to the RG 30 set on the HNSN 10, the HNSN 10 transmits a SOAP Request to the RG agent 36 and receives result/status information as a response.

(1) Control SOAP Request

When it is desired that the HNSN 10 control a specific device, a Control SOAP Request for controlling the device is transmitted to the RG agent 36, and the RG agent 36 controls the actual device and then transmits a Control SOAP Response, containing resulting values, to the HNSN 10.

(2) Query SOAP Request

When it is desired that the HNSN 10 know the status information of the specific device, a Query SOAP Request for performing querying the status information of the device is transmitted to the RG agent 36, and the RG agent 36 reads the current status information of the actual device and then transmits a Query SOAP Response, containing the status information, to the HNSN 10.

GENA Protocol

This is used when the HNSN 10 applies for or cancels event subscription, to monitor a specific device connected to the RG 10, and makes known events generated by the device.

1) Subscribe Request

This is used when it is desired that HNSN 10 subscribe to the events of a specific device of the RG 30. The RG agent 36 has stored the Subscription of the HNSN 10, and processes it when the events are generated from the corresponding device. Thereafter, the RG agent 36 transmits a GENA/Notify Request, containing the event, to the HNSN 10.

2) Unsubscribe Request

This is used when it is desired that the HNSN 10 cancel the event subscription of a specific device of the RG 30. The RG agent 36 deletes the stored subscription of the HNSN 10, and does not transmit a Notify Request to the HNSN 10 even when the corresponding device generates the events later.

3) Notify Request event is generated by

When the subscription of the HNSN 10 to a device has been stored in the RG 30 and the device generates events, the RG 30 transmits the Notify Request, containing event details, to the HNSN 10.

With reference to FIG. 4, the internal structure of the RG is described below. Relationships between the RG agent and the OSGi framework, the UPnP bundle, and the UPnP device services are described.

Relationship with the OSGi Framework

The RG agent 36 is implemented in bundle form installed on the OSGi framework (hereinafter referred to as a "framework"), and is a typical bundle application that can be driven by a bundle activator. The RG agent 36 fetches and uses packages provided by other bundles, and acquires and uses services registered by other bundles.

The RG agent 36 fetches the UPnP device service that has been registered on the framework 34 and constructs a list of devices, and monitors the registration, and registration cancellations, and changes of the UPnP device service in real time by registering a service monitor on the framework 34. Thereafter, UPnP event listener service, which is capable of listening to the events generated by the UPnP device service, is registered on the framework 34, so that the events of a specific device can be subscribed to.

Relationship with the UPnP Bundle

Although the RG agent 36 and the UPnP bundle are not directly related to each other, they are indirectly related to each other through the framework 34. The UPnP event listener service, which is registered on the framework 34 by the RG agent 36, is managed by the UPnP bundle, and events generated from the UPnP event listener service are collected by the UPnP bundle and are then transferred to the corresponding UPnP event listener.

Relationship with the UPnP Device Service

Devices, which are transmitted to the HNSN 10 by the RG agent 36, are UPnP device services, rather than physical devices connected to the actual RG 30. To implement UPnP device services is to perform communication using physical devices and interfaces.

The UPnP device services are classified into two types. One is for directly registering the UPnP device service on the framework 34 in a bundle, and the other is for allowing the UPnP bundle to detect actual UPnP devices, which are connected with the RG and exist on the local network, using the UPnP protocol, prepare UPnP device service, and register the UPnP device service on the framework 34. The former performs the UPnP protocol on the local network instead of the UPnP bundle, like the actual UPnP device, which is called a virtual UPnP device.

The RG agent 36 recognizes the two types of UPnP device services as UPnP device service without distinguishing them, and transmits the list of devices to the HNSN 10 upon receiving device list transmission request from the HNSN 10. Thereafter, when the registration or registration cancellation of the UPnP device services are make known through the service listener registered on the framework 34, the RG agent 36 updates the list of devices, which is transmitted to the HNSN 10, through SSDP-Notify-Alive or SSDP-Notify-Byebye in real time.

The RG agent 36 calls the API of managed UPnP device service upon receiving a device control and status query request from the HNSN 10. Thereafter, the RG agent 36 transmits returned values to the HNSN 10 as a response. In the case in which the API of the UPnP device service is called and the UPnP device service corresponds to the actual UPnP device that exist on the local network, the UPnP bundle transmits SOAP messages to the actual UPnP device, and receives and returns responses. In the case in which the UPnP device service corresponds to the virtual UPnP device, the UPnP bundle actually controls physical devices to which the implementation of the UPnP device services is connected, and receives and returns responses.

Figure 5:
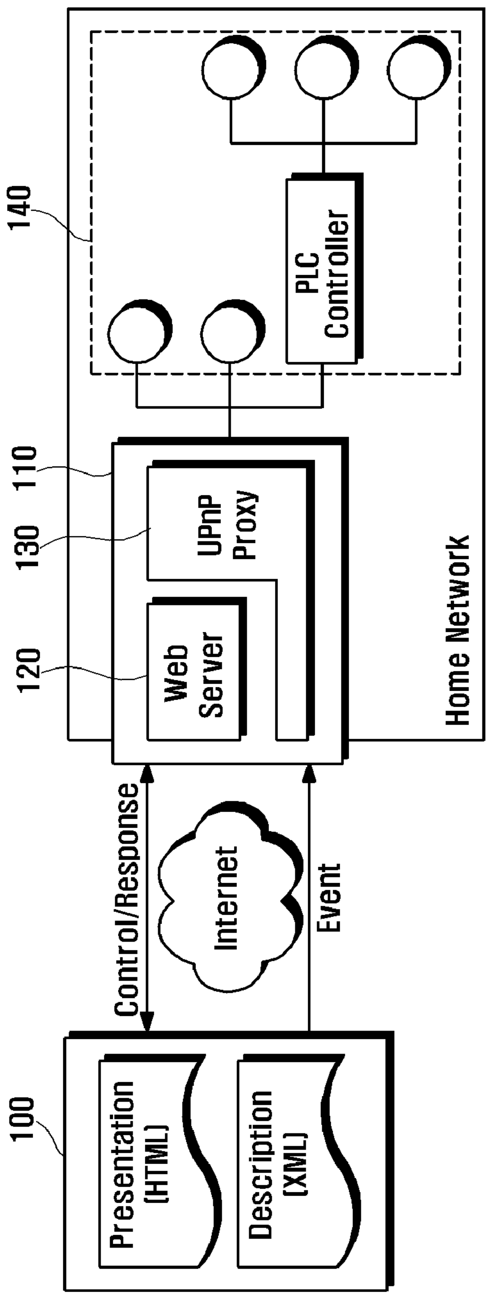
FIG. 5 is a diagram showing the construction of the UPnP-based RG of the present invention.

FIG. 5 is a diagram showing the construction of the UPnP-based RG of the present invention. As shown in FIG. 5, the UPnP-based RG includes an HNSN server 100 and an RG 110. The RG 110 is provided with a Web server 120 and a UPnP proxy 130. The RG 110 is connected with a plurality of devices 140.

The UPnP Proxy 130 of the RG 110 is constructed so as to provide a function by which a user can remotely control home appliances only using a browser. Furthermore, the UPnP Proxy 130 is constructed such that the user can use it by connecting to the HNSN server 100.

The UPnP Proxy 130 of the RG 110 operates in conjunction with the Web server 120, and provides various services to provide the user (client) remote control function. That is, the UPnP Proxy 130 discovers devices connected and disconnected to and from the home network, and creates a device list Web document using information about the devices. Furthermore, the UPnP Proxy 130 directly controls the devices according to user control commands transmitted from the user, and transmits response messages corresponding to the control. Furthermore, when device events are generated in the home network, the UPnP Proxy 130 transmits the events to the HNSN server 100 based on HTTP, thus allowing the user to know about the generation of the events.

Furthermore, the UPnP Proxy 130 changes the device list Web document so as to be compatible with the HNSN server 100 using the connectivity of Web documents and an existing UPnP API. Furthermore, the UPnP Proxy 130 automatically creates HTML and XML presentations based on device descriptions and service descriptions for devices that do not provide presentations.

Figure 6:
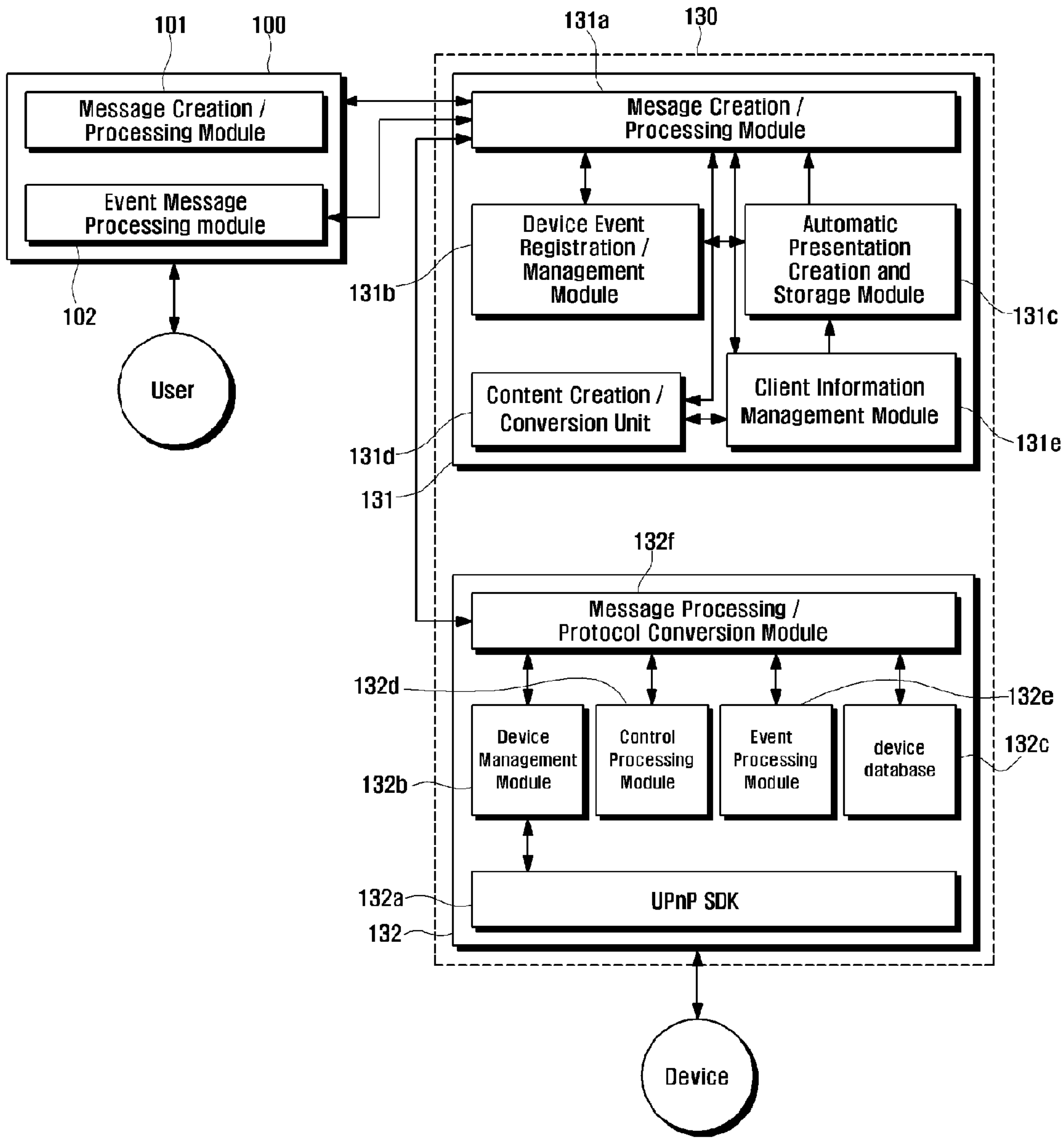
FIG. 6 is a diagram showing the construction of the module of the UPnP system of the present invention.

FIG. 6 is a diagram showing the construction of the module of the UPnP system of the present invention. As shown in FIG. 6, the UPnP system includes the HNSN server 100, and the UPnP Proxy 130. The HNSN server 100 provides interfaces between wired network users, wireless network users, and mobile phone users. The UPnP Proxy 130 implemented in the RG 110 includes an agent 131 and a bridge 132. Communication between the agent 131 and the bridge 132 is performed using HTTP.

The HNSN server 100 includes a message creation/processing module 101 and an event message processing module 102. The message creation/processing module 101 receives the device descriptions and the service descriptions from the RG 110 and stores basic information about the devices in a device information database, thus providing current status information and the basic information. The event message processing module 110 receives event messages transmitted from the Proxy, and transmits the received event messages to a handler management module.

The UPnP Proxy 130 includes the bridge 132 and the agent 131, and provides a remote control function to a user through interoperability between the bridge 132 and the agent 131. The bridge 132 controls and manages home network devices, and the agent 131 performs the creation, conversion, and transmission of content, or the transmission of events, to the user.

The bridge 132 discovers and manages devices connected to the home network using the UPnP Software Development Kit (SDK) 132*a* of Intel Co. A device management module 132*b* discovers devices connected and disconnected to and from the home network, and stores information about the devices in the device database 132*c*. Thereafter, a control processing module 132*d* controls the devices according to the user's control commands and, as a result, transmits response messages, but processes the response messages when an exceptional situations occurs. An event processing module 132*e* is a module that processes events when the statuses of the devices changes and, thereby, generates the events. On the basis of the bridge 132, messages defined by the bridge-device UPnP forum are used, and remote control protocols are used between the bridge 132 and the agent 131 and between the agent 131 and the HNSN server 100. Accordingly, the bridge 132 performs conversion between the two protocols, which are performed in a message processing/protocol conversion module 132*f*.

The agent 131 is provided with the message creation/processing module 131*a* that operates in conjunction with the message processing/protocol conversion module 132*f* and the message creation/processing module 101 of the HNSN server 100. The message creation/processing module 131*a* is connected with an device event registration/management module 131*b*, an automatic presentation creation and storage module 131*c*, a content creation/conversion unit 131*d*, and a client information management module 131*e*, and operates in conjunction with them.

The Definitions of the remote control protocols are given in the following Table 3.

TABLE 3

| Type | Message | Protocol | Direction | Main function |
|---|---|---|---|---|
| Registration | Registration | SOAP | HNSH ← RG | RG IP, Communication Port, ID, Password Registration |
| | Alive | SOAP | HNSH ← RG | Periodic RG IP Transmission |
| | Bye | SOAP | HNSH ← RG | RG Registration Cancellation |
| Discovery | Search | SSDP | HSNS → RG | Device List Request |
| | Advertise | SSDP | HNSN ← RG | Description Information Transmission for Device List Request |
| Description | Device | HTTP | HNSN → RG | Device Description Transmission |
| | Service | HTTP | HNSN → RG | Service Description Transmission |
| Query & Control | Query | SOAP | HNSN → RG | Device Status Information Transmission |
| | Control | SOAP | HNSN → RG | Device Control |
| Event | Subscribe | GENA | HNSN → RG | Event Registration |
| | Notify | GENA | HNSN ← RG | Event Generation Transmission |
| Reboot | | SOAP | HNSN → RG | RG Remote Rebooting |
| Update | | SOAP | HNSN → RG | Device Software Upgrade |

Figure 7:
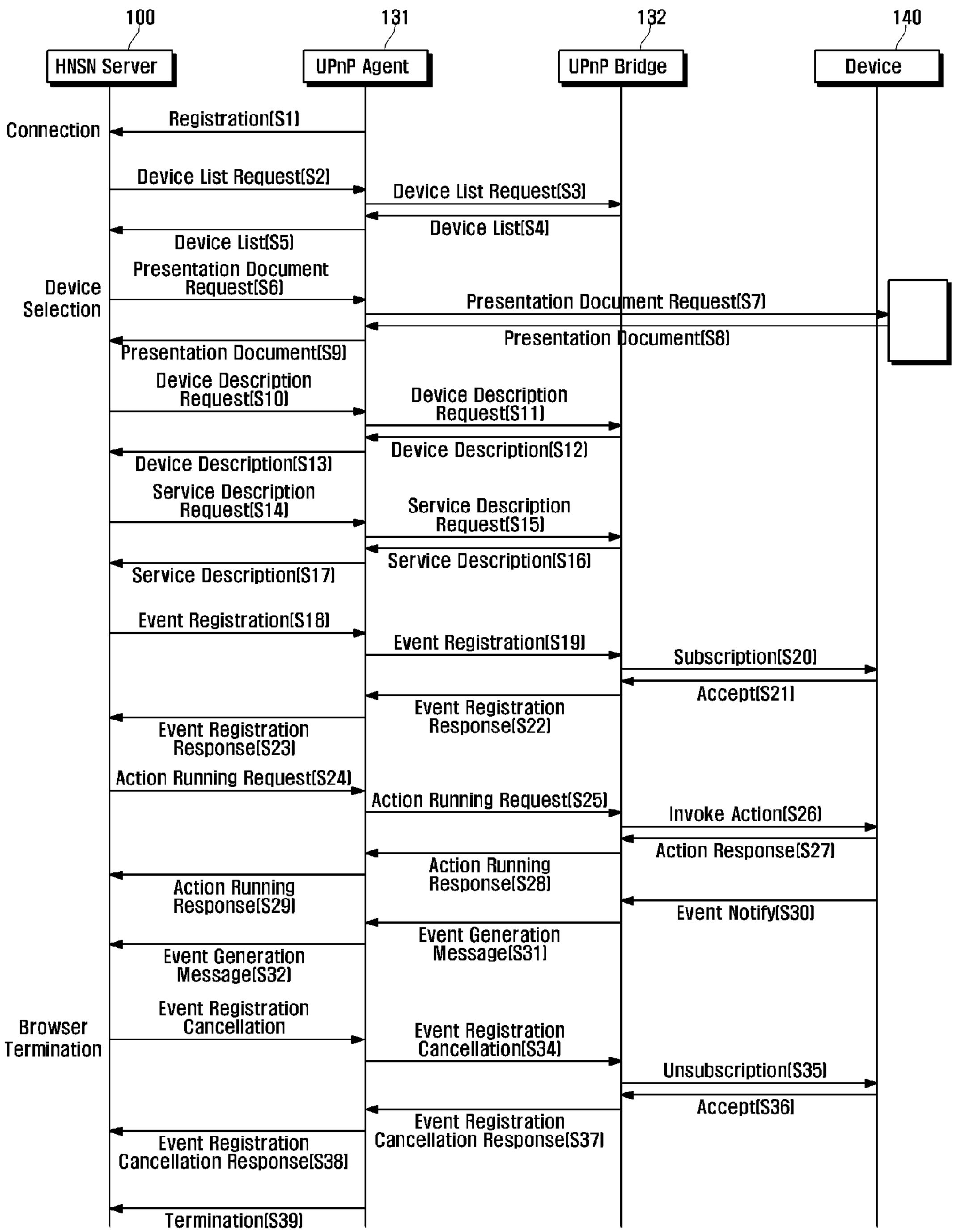
FIG. 7 is a flowchart illustrating messages in the UPnP based-RG system of the present invention.

FIG. 7 is a flowchart illustrating messages in the UPnP based-RG system of the present invention. Referring to FIGS. 6 and 7, when the RG 110 is booted up, the RG 110 transmits information about a UPnP-related IP, a port, an ID, and a password to the HNSN server 100, and performs registration, at step S1.

A user makes a connection to the HNSN server 100, and the HNSN server 100 requests the list of devices from RG 110, at step S2. The agent 131, which receives the request, requests the list of devices from the bridge 132 at step S3. The list of devices is transmitted to the HNSN server 100 using the list of devices at steps S4 and S5.

The HNSN server 100 fetches the device descriptions and the service descriptions from the RG 110 using the URL information in messages according to the list of devices.

The user visits the URL of the HNSN server 100 and selects a desired device to control it.

After selecting the device, the user selects control information from a Web document prepared using device description and service description documents received from the RG 110.

The user issues device control commands according to the selection of the control information on the Web document.

The agent 131, which has received device control messages from the HNSN server 100, transmits the control messages to the bridge 132, and the bridge 132 converts the control messages into SOAP messages to transmit them to the device, at steps S6 to S9.

The HNSN server 100 requests and fetches the device descriptions and service descriptions from the RG 110 at steps S10 to S17.

The HNSN server 100 registers events for a device desired to be controlled, thus allowing event messages to be received when the corresponding device generates the events, at steps S18 to S29.

When the events are generated by the device, the bridge 132 transmits the generated events to the agent 131, and the agent 131 transmits the received events to the HNSN server 100, at steps S30 to S32.

When the user closes the Web browser, the HNSN server 100 performs a termination process.

The HNSN server 100 transmits an event registration cancellation message for the device to the agent 131.

The agent 131 transmits the message to the bridge 132, and the bridge 132 transmits the event registration cancellation message to the device, at steps S33 to S38. Thereafter, a termination process is performed at step S39.

The above-described details are described in more detail with reference to FIG. 8.

Figure 8:
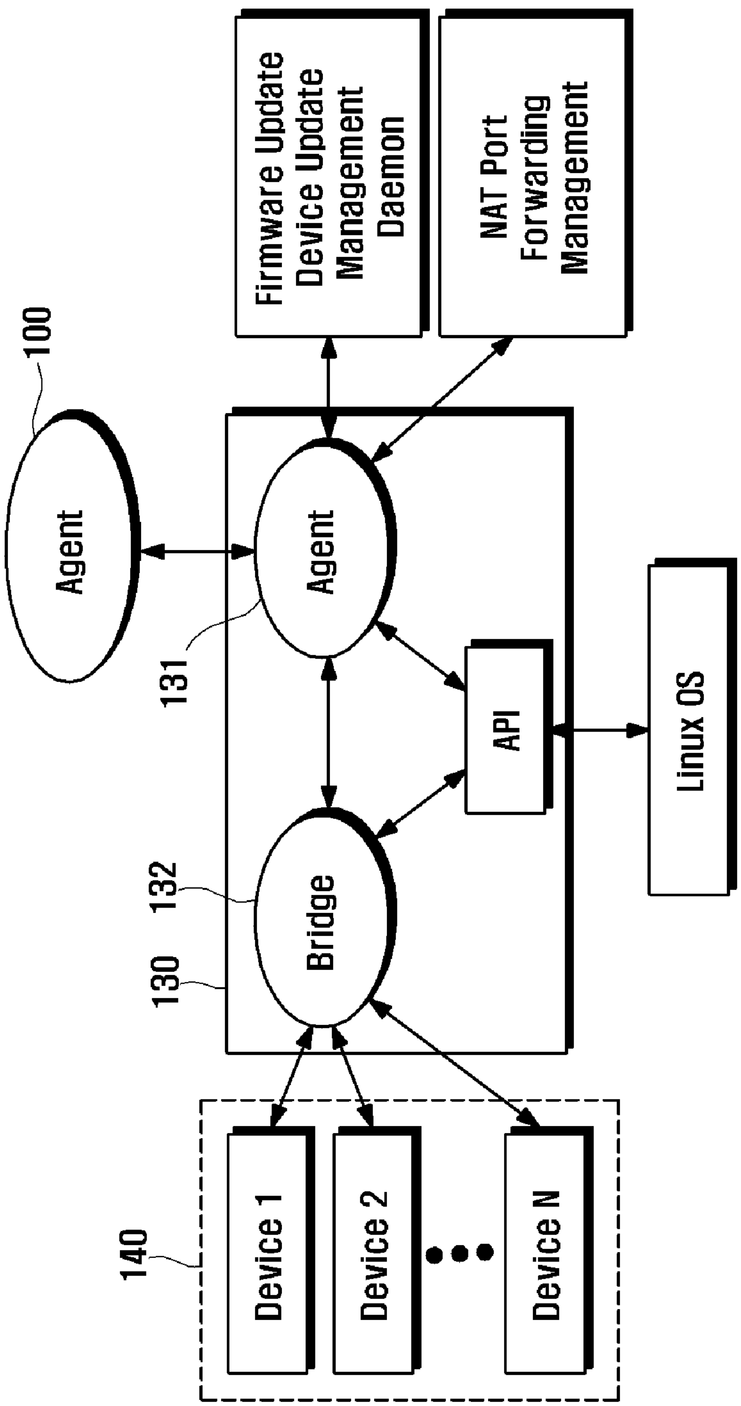
FIG. 8 is a diagram showing communication structure with the HNSN server of the present invention.

FIG. 8 is a diagram showing communication structure with the HNSN server of the present invention. As shown in FIG. 8, the RG 110 includes the bridge 132 and the agent 131. These perform communication with the HNSN server 100 and also perform management and control on the UPnP device 140. Firmware update and device update portion is constructed using a management daemon program.

The function of each construction is schematically described below.

1) The function of the agent 131 (C program)

The conversion of the device description

The conversion and processing of SSDP, SOAP, and GENA protocol messages

The installation of a communication module with the HNSN

The transmission of a home Web Page.

The performing of reboot and fireware update functions

The function of setting and canceling ports for NAT port forwarding

2) The function of the bridge 132 (C program)

The processing of device control messages

Event management (Subscribe and Unsubscribe)

The management of devices by the change of documents according to a UPnP standard 3) Update management Daemon (C program)

Firmware Update

Device Update

Industrial Applicability

As described above, the residential gateway system for home network service according to the present invention can be applied to an OSGi and UPnP-based home network service field.

From above-describe details, those skilled in the art will appreciate that various modifications are possible without departing from the technical spirit of the invention. Accordingly, the scope of the invention must not be limited to only details of the above-described embodiment, but defined by the claims.

The invention claimed is:

1. A Residential Gateway (RG) system for home network service, the RG system receiving various supplementary services through a Home Network Serving Node (HNSN) that provides home network service, the RG system comprising:

an Open Service Gateway initiative (OSGi) framework;

an RG agent installed on the OSGi framework, and implemented in bundle form functioning as a web server in communication with the HNSN and as a proxy for devices connected on a home network, the RG agent configured with modules to manage the devices, convert protocols, process control messages received from the HNSN that are generated by a user, perform a control based on the control messages received, and communicate content;

a virtual Universal Plug and Play (UPnP) device registered on the OSGi framework by the RG agent; and a java virtual machine ported by the RG agent on hardware on which an operating system is installed, wherein the RG agent is further configured to detect connection and disconnection of the devices with the RG system, create a device list Web document, transmit a response message regarding the control to the HNSN, and monitor events generated by the devices.

2. The RG system according to claim 1, further comprising:

a Hydrologic Modeling System (HMS) User Interface (UI) for supporting a graphic interface for the RG system; and an Operation, Administration, and Maintenance (OAM) for undertaking network setting of the RG system.

3. The RG system according to claim 1, wherein the virtual UPnP device performs an UPnP protocol on a local network to perform as an actual UPnP device.

4. The RG system according to claim 1, wherein the RG agent is further configured to implement one of an HNSN, Simple Service Discovery Protocol (SSDP), Hypertext Transfer Protocol (HTTP), Simple Object Access Protocol (SOAP), and General Event Notification Architecture (GENA).

5. The RG system according to claim 1, wherein the RG agent is further configured to operate in conjunction with the HNSN, which exists on a control Internet Protocol (IP) network, using an RG-H interface, and provide one of functions of registration and authentication of the RG agent, periodic RG keep-alive message transfer, controlling and monitoring of devices connected to the RG system, rebooting of the RG agent, and updating of bundles.

6. The RG system according to claim 1, wherein the RG agent is configured to be connected to home devices using at least one of an RG-UPnP device interface and an RG-Recommended Standard (RS)-485 device interface.

7. The RG system according to claim 1, wherein the RG agent is further configured to enable the user to directly control home devices.

8. The RG system according to claim 1, wherein the RG agent is further configured to enable the java virtual machine to be ported to hardware using a java virtual machine porting interface.

9. The RG system according to claim 1, wherein the RG agent is further configured to provide an interface between the OSGi framework and bundles using an OSGi framework application program interface.

10. A residential gateway (RG) system for home network service, comprising:

an Open Service Gateway initiative (OSGi) framework;

an RG agent installed on the OSGi framework, and implemented in bundle form functioning as a web-serving agent for content and event communication and as a Universal Plug and Play (UPnP) proxy, wherein the UPnP proxy further includes a UPnP Software Development Kit (SDK), a device management module, a device database, a control processing module, an event processing module, and a message processing/protocol conversion module, and wherein the RG agent detects devices connected and disconnected to and from the home gateway;

creates a device list Web document;

receives a remote control signal, which is generated by a user, from the HNSN and performs control;

transmits a response message regarding the control; and monitors event generation by the devices; and UPnP device service registered on the OSGi framework by the RG agent.

11. The RG system according to claim 10, wherein the RG agent fetches the UPnP device service and make a list of devices.

12. The RG system according to claim 10, wherein the RG agent registers a service monitor on the OSGi framework, and monitors any one of registration, registration cancellation, and registration changes in the UPnP device service in real time.

13. The RG system according to claim 10, wherein the RG agent registers a UPnP event listener service, which is capable of listening to events generated by the UPnP device service, on the framework, thus being capable of subscribing to events of a specific device.

14. The RG system according to claim 13, wherein the UPnP event listener service, which is registered on the framework by the RG agent, is managed by a UPnP bundle, and events generated from the UPnP event listener service are collected by the UPnP bundle and are then transferred to a corresponding UPnP event listener.

15. The RG system according to claim 10, wherein the UPnP device service is either a UPnP device service that is directly registered on the framework in a single bundle, or a UPnP device service that detects an actual UPnP device, which exists on a local network connected to an RG, using a UPnP protocol, and then prepares UPnP device service and registers the UPnP device service on the framework.

16. The RG system according to claim 15, wherein the RG agent recognizes the two types of services as UPnP device service without distinguishing the services.

17. A Universal Plug and Play (UPnP)-based residential gateway (RG) system for home network service, the RG system comprising:

a home network service node (HNSN) connected to a mobile network to control devices and transfer control statuses of the devices; and a home gateway connected to the HNSN through a network and connected to the devices, wherein the home gateway comprises a Web server and a UPnP proxy that detect devices connected and disconnected to and from the home gateway, and create a device list Web document, receive a remote control signal, which is generated by a user, from the HNSN and perform control, transmit a response message regarding the control, and monitor event generation by the devices, wherein the UPnP proxy comprises, an agent for performing either creation, conversion, or transmission of content, or transmission of events through hypertext transfer protocol (HTTP) communication; and a bridge for controlling and managing the devices of the home network, wherein the bridge comprises, a UPnP Software Development Kit (SDK) for recognizing and managing the devices connected to the home network;

a device management module for recognizing the devices connected and disconnected to and from the home gateway and learning corresponding information;

a device database for storing information input and output to and from the device management module;

a control processing module for controlling the devices according to a user's control command, transmitting a response message, and performing processing and storage when an exceptional situation occurs;

an event processing module for processing events when status of the devices change and, thus the events are generated; and a message processing/protocol conversion module for performing conversion between protocols of the agent and the HNSN.

18. The UPnP-based RG system according to claim 17, wherein Web document communication between the HNSN and the UPnP proxy uses a UPnP Application Programming Interface (API).

19. The UPnP-based RG system according to claim 17, wherein the HNSN comprises:

a message creation/processing module device for receiving device descriptions and service descriptions from the home gateway, storing basic information of the devices, and providing current status information and the basic information; and an event message processing module for receiving event messages transmitted from the UPnP proxy, and transmitting the received event messages to an event control module.

20. The UPnP-based RG system according to claim 17, wherein the agent comprises an automatic presentation creation and storage module for creating HTML or XML presentations based on device descriptions and service descriptions for devices that do not provide presentations.

* * * * *